Feb. 11, 1936.  H. E. KEMPTON  2,030,303

SEAL FOR ROTARY ENGINES

Filed Nov. 18, 1931  2 Sheets-Sheet 1

Inventor:—
Herbert E. Kempton
By Fred Gerlach
his Atty.

Feb. 11, 1936. H. E. KEMPTON 2,030,303
SEAL FOR ROTARY ENGINES
Filed Nov. 18, 1931 2 Sheets-Sheet 2
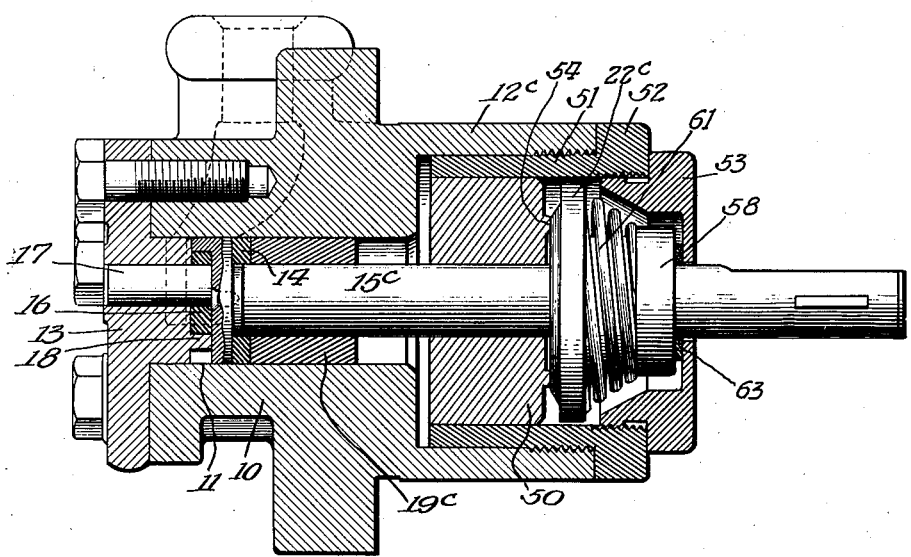
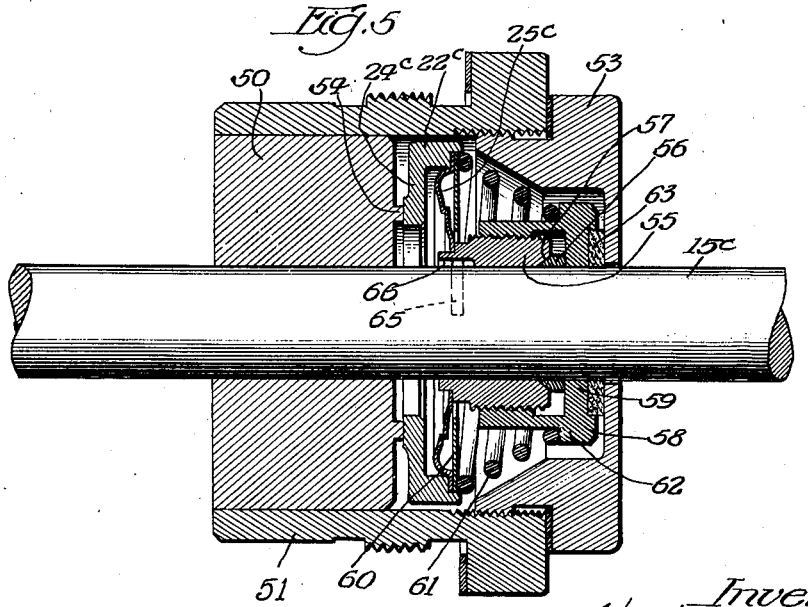

Patented Feb. 11, 1936

2,030,303

UNITED STATES PATENT OFFICE 2,030,303

SEAL FOR ROTARY ENGINES

Herbert E. Kempton, Chicago, Ill., assignor to Tuthill Pump Company, Chicago, Ill., a corporation of Illinois Application November 18, 1931, Serial No. 575,693

3 Claims. (Cl. 286—11)

This invention relates generally to rotary engines, and more particularly to an improved sealing means between two relatively rotating parts, this application being a continuation in part of my copending application Serial No. 319,217, filed November 14, 1928, now Patent No. 1,972,565, dated Sept. 4, 1934.

The general object of the present invention resides in the provision of a novel mechanical seal for preventing the leakage of fluid past bearing surfaces of relatively rotary parts.

Other objects of the invention reside in the provision of a new and improved mechanical seal which will not collapse under pressure, in which the sealing surfaces are close to the center of the rotating body, and in which the sealing surfaces are pressed into bearing engagement with a definite pressure by a resilient fluid-tight mounting so as to seat said surfaces squarely and tightly together.

A more specific object resides in the provision in a seal packing comprising a rotary member, a seal ring and a flexible diaphragm for providing a yieldable fluid-tight connection between the member and the ring, of an axial opening in the ring large enough to receive a tool for securing the diaphragm to the member, thereby facilitating the assembly of the parts.

A further object resides in the provision of a novel mechanical seal packing in which the sealing surfaces are positively lubricated by oil from a closed or sealed chamber, lubrication being aided by centrifugal force.

Other objects and advantages will become apparent as the description proceeds.

In the accompanying drawings:

Fig. 4 is a longitudinal vertical sectional view of another device embodying another form of my invention.

Fig. 5 is an enlarged fragmentary portion of Fig. 4.

Figure 1:
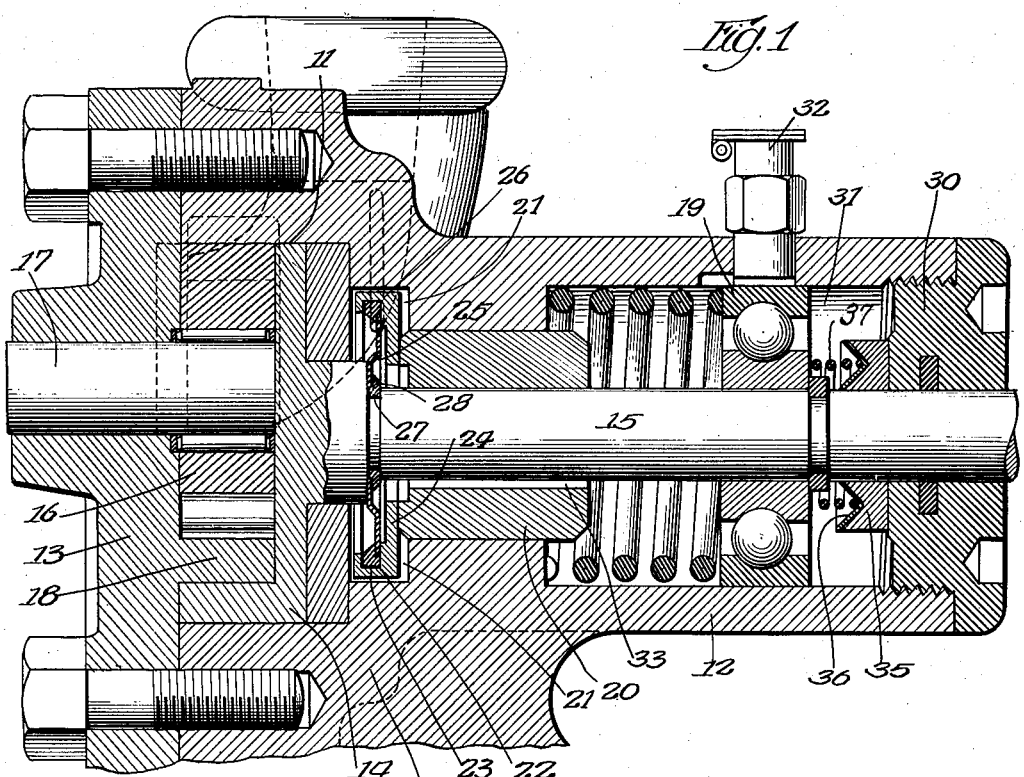
Fig. 1 is a longitudinal vertical sectional view of a device embodying the features of my invention.

While the invention is susceptible of various modifications and alternative constructions, I have shown in the drawings and will herein describe in detail several embodiments, but it is to be understood that I do not thereby intend to limit the invention to the specific forms disclosed, but intend to cover all modifications and alternative constructions falling within the spirit and scope of the invention as expressed in the appended claims.

The invention has a wide range of applicability, and is intended to prevent the leakage of pressure fluid from a chamber, in which a revolving member is positioned, to or past the bearings for said member. It is particularly adapted for use in rotary engines, such as fluid pumps or motors, and hence I have shown and will describe it in connection with the rotary gear and pinion type of pump.

Referring more specifically to the exemplary embodiment of the invention illustrated in the drawings, the pump comprises a suitable casing 10 which is cylindrical in shape and has a pumping chamber 11. Suitable inlet and outlet passages are formed in the casing 10 and open to opposite sides of the chamber 11. Preferably, the casing is formed integral with a tubular bearing support 12 on one end, the other end of the casing being closed by a removable head 13.

Rotatably mounted in the chamber 11 is a rotor 14 having a suitable coaxial drive shaft 15 projecting therefrom through the bearing support 12 for connection to a suitable source of power (not shown). In the present instance, the rotor 14 is formed on its front end with a plurality of peripherally spaced internal gear teeth and meshes with a pinion 16 which is mounted on a pin 17 fixed to the cover plate 13. Disposed between the rotor teeth and the pinion is a crescent cut-off partition 18 formed integral with the cover plate 13. The general construction thus far disclosed is well understood, and taken by itself forms no part of the present invention.

The present invention resides in the sealing means for preventing pressure fluid in the chamber 11 from passing to or through the bearing for the shaft 15. As illustrated in Fig. 1, the shaft is suitably journaled in a ball bearing 19 and a bushing 20 which is tightly secured in the inner end of the bearing support 12 and extends slightly into a small concentric chamber 21 formed in the inner or rear end wall of the chamber 11. A mechanical seal means is mounted in the chamber 21 to prevent the leakage of fluid from the chamber 11 to the bearing surfaces between the shaft 15 and the bushing 20. This seal also prevents air from passing through the bearing 20 to the chamber 11.

Referring to Fig. 1, this sealing means comprises an annular member or ring 22 having an annular groove 23 in its inner periphery, and having an inwardly extending radial flange 24 at one end. The outer face of the flange 24 is lapp ground, and is adapted to bear against the inner end of the bushing 20 which is also lapp ground. The lapped surfaces provide a fluid-tight seal. Secured in the ring 22 to support the same is a diaphragm 25 which may be of any suitable form, and which preferably is resilient. In the present instance, this diaphragm has a fluid-tight connection with the ring 22 in the groove 23 by reason of an annular copper ring 26 swedged or expanded therein. The diaphragm 25 also has a fluid-tight connection with the shaft 15, and hence is rotatable with the latter. To this end, the inner peripheral edge of the diaphragm is secured in an annular groove or recess 27 in the shaft by means of a copper ring 28 pressed therein. It will be evident that the inherent resiliency of the diaphragm will retain the lapped surfaces in bearing engagement and will cause them to seat squarely together so as to effect a fluid-tight seal.

The annular opening through the flange 24 is of such size that a tool for applying the ring 28 may be inserted therethrough along the shaft 15 to facilitate this operation. This is a highly advantageous detail of construction resulting in ease of assembly.

In the form illustrated in Fig. 1, means is provided for lubricating the bearing surfaces and the seal. To this end, the rear end of the shaft 15 extends through a suitable packing gland 30 closing the outer end of the bearing support 12. The bearing support 12 is enlarged between the bushing 20 and the gland 30 to provide a lubricating chamber 31 adapted to be filled with lubricant through a suitable fitting 32. The bushing 20 is formed with a longitudinal groove 33 next to the shaft 15 for admitting lubricant to the bearing surfaces and the lapped sealing surfaces. Thus the bearing parts are lubricated by a special lubricant instead of by fluid leaking thereto from the chamber 11.

Mounted on the shaft 15 between the packing gland 30 and the ball bearing 19 is a suitable cup leather lapp ring 35 which bears against the inner end of the gland. The free end of the ring 49 is formed with an annular V-shaped notch in which a similarly shaped steel washer 36 is positioned. A coil spring 37 is disposed about the shaft 15 between the washer 36 and the inner raceway of the ball bearing 19, and serves to hold the ring 35 against the gland 30 so as to provide a seal for the lubricant.

Figures 2, 3:
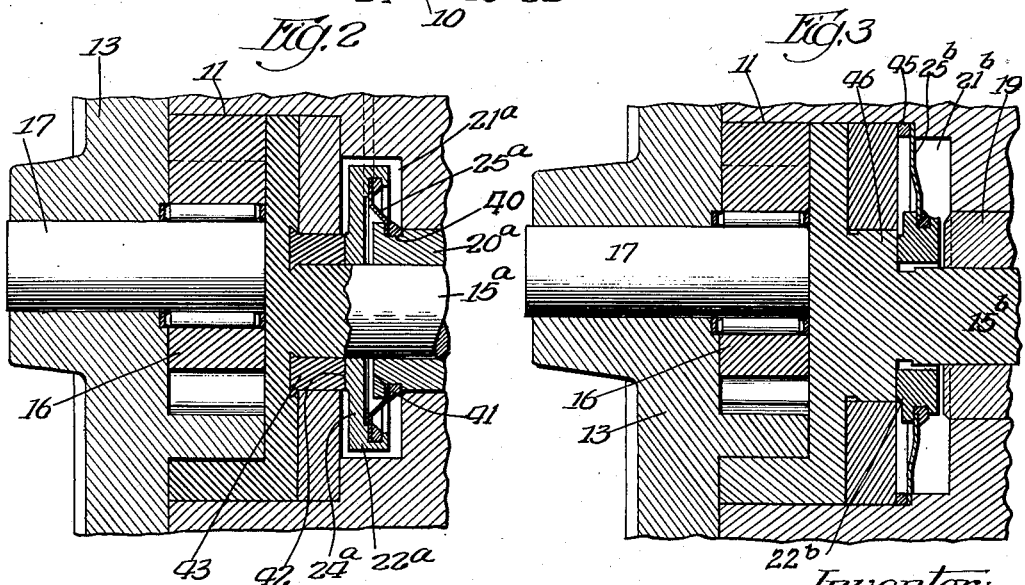
Fig. 2 is a fragmentary vertical sectional view of a modified form of my invention.
Fig. 3 is a fragmentary vertical sectional view of another modified form of my invention.

The sealing ring may rotate with the shaft 15 as illustrated in Fig. 1, or, as shown in Figs. 2 and 3, the ring may be fixed in the casing against rotation and bear against the rotatable part. Referring first to Fig. 2, the inner edge of the diaphragm disk 25ᵃ is secured in an annular notch 40 in the inner end of the bushing 20ᵃ by means of a clamping ring 41, the bushing being extended into the chamber 21ᵃ for this purpose. The outer edge of the diaphragm is secured to the ring 22ᵃ in the same manner as in Fig. 1. The radial flange 24ᵃ in this form of the invention, projects inwardly to the periphery of the shaft 15ᵃ and bears against a lapped shoulder 42. The shoulder may be provided by an enlargement of the shaft as shown in Fig. 1, or by a separate ring 43 tightly secured thereon and swedged to the rotor 14.

In the form shown in Fig. 3, the outer edge of the diaphragm 25ᵇ is secured in a peripheral notch 45 in the chamber 21ᵇ, and a sealing ring 22ᵇ is secured to the inner edge of the diaphragm and bears against a lapped surface on an enlargement 46 on the shaft 15ᵇ.

In Figs. 4 and 5, there is disclosed another embodiment of the invention in which the rotatable drive shaft 15ᶜ is mounted at one end in a sleeve bearing or bushing 19ᶜ and at its other end in a sleeve bearing or bushing 50. The bushing 50 is pressed into one end of a sleeve 51 which is positioned in the bearing support 12ᶜ and having an outwardly extending flange 52 abutting the end thereof. The sealing means is disposed intermediate the bushing 50 and a cap or cover plate 53 and comprises a sealing ring 22ᶜ having an inwardly extending flange 24ᶜ provided with a lapped surface engaging a coacting lapped surface formed on a projecting annular portion 54 of the bushing 50. A flexible annular diaphragm 25ᶜ has its outer edge soldered to the ring 22ᶜ and at its inner end is soldered to one end of a threaded sleeve 55. This sleeve is connected to the shaft 15ᶜ by means of a pin 65 which is inserted in a suitable recess in the shaft and engages in a slot 66 in the sleeve so that the sleeve rotates with the shaft. Preferably the sleeve is sealed to the shaft 15ᶜ by means of a soft compression washer 56 which is pressed into a counterbore 57 in the sleeve 55 by means of a nut device 58 screw threaded onto the bushing 55 and having an inwardly extending flange 59 abutting said washer. For placing a constant pressure of the sealing ring 22ᶜ against the bushing 50, a washer 60 is preferably positioned against the outer edge of the diaphragm 25ᶜ and a coiled spring 61 inserted between said washer and an outwardly extending flange 62 on the nut 58. A felt ring 63 is preferably positioned surrounding the shaft 15ᶜ intermediate the nut 58 and the stationary cap 53.

It will be readily apparent from Figs. 4 and 5 that the entire sealing means and mounting therefor may be readily installed in the device illustrated, and furthermore that the sealing means may be readily replaced. To remove the seal assembly the cap 53 and felt ring 63 are detached, whereupon by loosening the nut 58 the said nut, washer 56, sleeve 55, diaphragm 25ᶜ, sealing ring 22ᶜ and spring 61 may be slid off the end of the shaft. Thereafter the sleeve 51 may be unscrewed.

Having thus described the invention, what I claim as new and desire to secure by Letters Patent, is:

1. In combination with a device of the character described comprising a casing having a hollow cylindrical portion and a shaft extending therethrough, a detachable tubular member adapted to be secured in said hollow portion a sleeve bearing positioned in the inner end of said tubular member through which the shaft extends, an annular sealing member surrounding said shaft within said tubular member and having a lapped surface engaging a correspondingly lapped surface on said bearing, an annular flexible diaphragm having its outer edge secured to the periphery of the sealing member, an externally threaded sleeve fitted tightly on said shaft and secured at one end to the inner edge of said diaphragm, said sleeve being countersunk around said shaft at its other end, a soft metal sealing ring positioned in said countersink, a tubular nut interiorly threaded for engagement with said sleeve having an inwardly extending flange adapted to engage said sealing ring for securing the ring tightly in place, and having also an outwardly extending flange, a coiled spring positioned intermediate said outwardly extending flange and said sealing member to hold said sealing member yieldingly against said bearing, a felt ring surrounding said shaft adjacent said inwardly extending flange, and a cap member screw threaded into said tubular member and having an end wall engaging said felt ring.

2. In combination with a device of the character described comprising a casing and a shaft rotatably mounted therein, a detachable tubular member adapted to be secured in said casing, a sleeve bearing positioned in the inner end of said tubular member through which the shaft extends, an annular sealing member surrounding said shaft and having a lapped surface engaging a correspondingly lapped surface on said bearing, an annular flexible diaphragm having its outer edge secured to the periphery of the sealing member, an externally threaded sleeve fitted tightly on said shaft and secured at one end to the inner edge of said diaphragm a sealing ring positioned against the other end of said sleeve, a tubular nut interiorly threaded for engagement with said sleeve having an inwardly extending flange adapted to engage said sealing ring for securing the ring tightly in place and having also an outwardly extending flange, a coiled spring positioned intermediate said outwardly extending flange and said sealing member to hold said sealing member yieldingly against said bearing, and a closure screw threaded onto the outer end of said tubular member.

3. In combination with a device of the character described comprising a casing and a shaft rotatably mounted therein, a detachable tubular member adapted to be secured in said casing, a sleeve bearing positioned in the inner end of said tubular member through which said shaft extends, an annular sealing member surrounding said shaft and within said tubular member and having a lapped surface engaging a correspondingly lapped surface on said bearing, an annular flexible diaphragm having one edge secured to the sealing member, a sleeve fitted tightly on said shaft and secured at one end to the other edge of said diaphragm, a sealing ring positioned against the other end of said sleeve, means for securing said ring tightly in place, and a detachable closure secured to the outer end of said tubular member and cooperating with said tubular member and sleeve bearing to enclose said other parts.

HERBERT E. KEMPTON.